May 9, 1939.   R. S. JACOBSEN   2,157,757
VARIABLE SPEED TRANSMISSION
Filed June 4, 1936   2 Sheets-Sheet 1
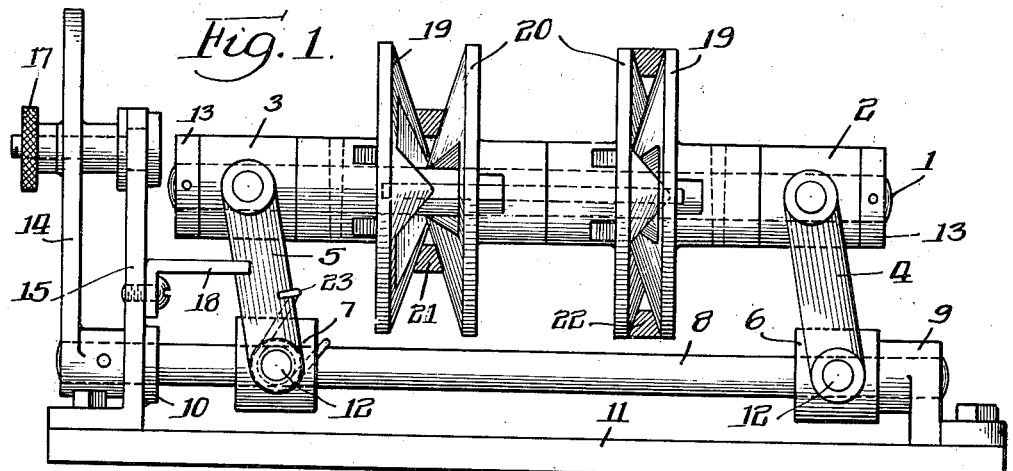
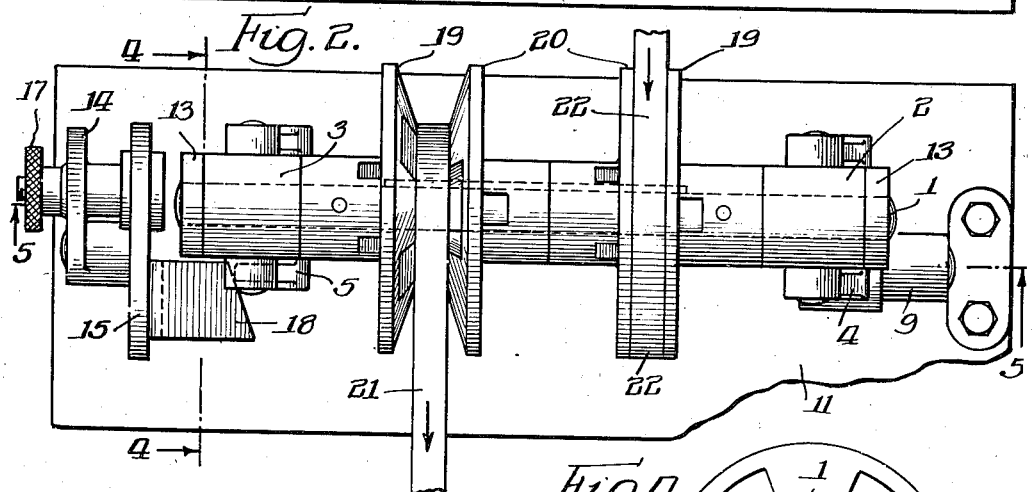
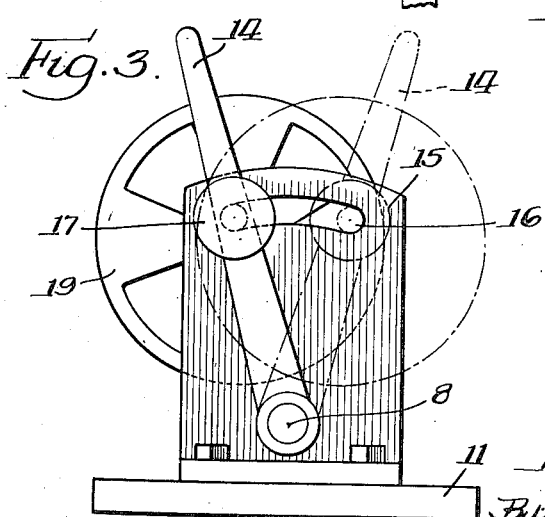
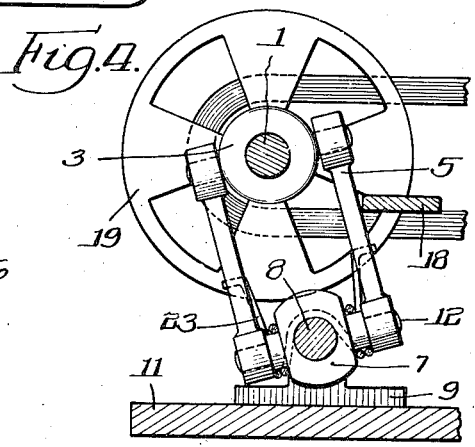
Inventor:-
Richard S. Jacobsen
By Arthur F. Durand
atty.

May 9, 1939.  R. S. JACOBSEN  2,157,757
VARIABLE SPEED TRANSMISSION
Filed June 4, 1936  2 Sheets-Sheet 2
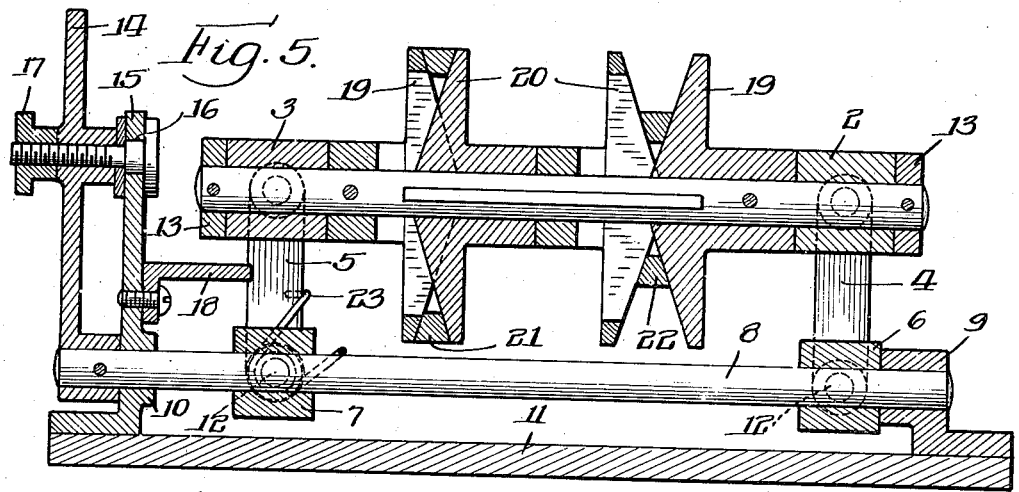
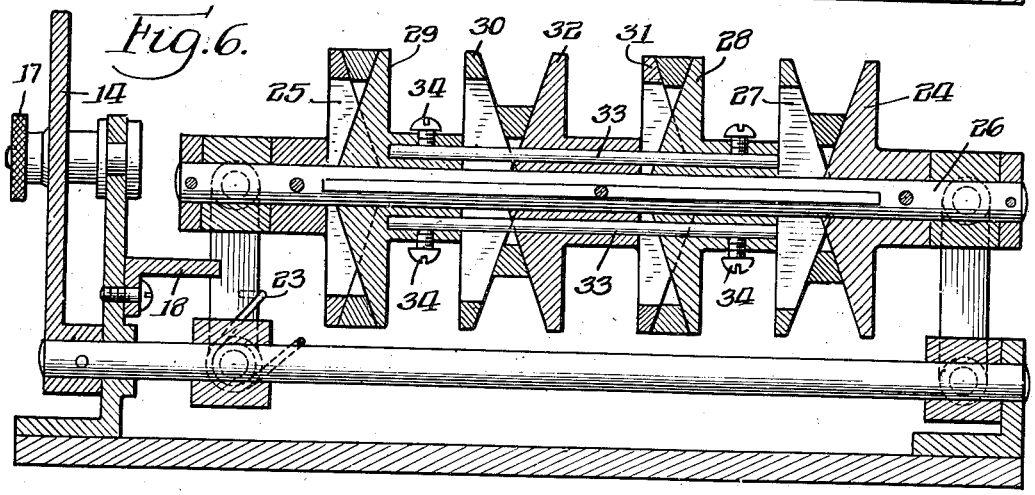
Inventor
Richard S. Jacobsen
By Arthur F. Denard
atty.

Patented May 9, 1939

2,157,757

UNITED STATES PATENT OFFICE 2,157,757

VARIABLE SPEED TRANSMISSION

Richard S. Jacobsen, Wheaton, Ill.

Application June 4, 1936, Serial No. 83,409

16 Claims. (Cl. 74—230.17)

This invention relates to variable speed power transmission devices, and more particularly to those of the kind that employ a belt and pulley type of transmission drive.

Generally stated, the object of the invention is to provide a novel and improved construction and arrangement whereby a motor or engine may be connected to operate a machine, by means of a variable speed power transmission having belts and pulleys, in a manner obviating the necessity of any lateral movement of the motor shaft, or the machine shaft, whereby each shaft has a fixed axis of rotation, with the variable power transmission provisions located intermediate one shaft and the other shaft, and provided with novel controlling means therefor.

It is also an object to provide certain details and features of construction and combinations tending to increase the general efficiency and desirability of a belt and pulley variable speed power transmission of this particular character.

To the foregoing and other useful ends, the invention consists in matters hereinafter set forth and claimed and shown in the accompanying drawings, in which—

Fig. 1 is a side elevation of a variable speed power transmission device embodying the principles of the invention;

Fig. 2 is a plan view of the parts shown in Fig. 1 of the drawings;

Fig. 3 is an end elevation of said device;

Fig. 4 is a transverse vertical section on line 4—4 in Fig. 2 of the drawings;

Fig. 5 is a longitudinal section on line 5—5 in Fig. 3 of the drawings;

Fig. 6 is a view similar to Fig. 5, showing a different form of the invention.

As shown in Figs. 1 to 5, inclusive, of the drawings, the invention comprises a shaft 1, supported and rotated in bearings 2 and 3, said bearings being carried by links 4 and 5, mounted on the blocks 6 and 7 that are keyed to the rock shaft 8, which latter is supported in bearings 9 and 10, secured to the base 11, or any suitable support. Thus, the links 4 and 5 are adapted to swing about their pivots 12, to permit endwise displacement of the shaft 1, and the shaft 8 rocks in its bearings to permit lateral displacement of the shaft 1, when it is desired to change the speed of transmission. The sleeves 2 and 3 are held against axial displacement by collars 13, suitably secured to the shaft 1. A handle 14 is keyed to the shaft 8, to rock the latter, and the bearing 10 has an upper portion 15 provided with a segmental slot 16 for the screw adjustment lock device 17, whereby the handle 14 can be set at any desired position, by tightening the said screw adjustment device. Just above the bearing 10, there is a stationary cam plate 18, fastened to the bracket that forms the bearing 10 and the portion 15 previously mentioned, this cam plate being disposed in position to engage the link 5, and to thereby move the shaft 1 endwise to the right, when the handle 14 is pulled into the position shown in dotted lines in Fig. 3 of the drawings.

Two V-shaped pulleys are splined on the shaft 1, each pulley comprising an outer section 19 and an inner section 20, movable toward and away from each other, the two sections of each pulley being relatively formed to fit into each other to form a small V-groove, as shown at the left in Fig. 5 of the drawings, or to move apart and form a wide and deep V-groove, as shown at the right in Fig. 5 of the drawings. A V-belt 21 engages the pulley sections 19 and 20 at the left in Figs. 1, 2 and 5, and a similar V-belt 22 engages the other two pulley sections, one belt extending in one direction, and the other belt extending in the opposite direction, whereby one belt may be the driving belt from a motor, and the other belt may be the belt leading to the machine to be operated by said motor. Each belt, at its other end, is engaged with an ordinary V-pulley having an axis of rotation held against lateral displacement.

With this construction, assuming that the handle 14 is thrown into the position shown in dotted lines in Fig. 3 of the drawings, the parts will then assume the position shown in Fig. 5 of the drawings. This will be brought about by the pull on belt 22, which tends to move the sections 19 and 20 of its pulley apart, as shown at the right in Fig. 5, and causing the resulting slack in the belt 21 to be taken up by a relative movement of its pulley sections 19 and 20 toward each other, as shown at the left in Fig. 5 of the drawings. By the provision of the cam plate 18, and the arrangement whereby the shaft 1 has endwise displacement, it will be seen that this compensates for the movement of the two sections 19 and 20 to the left, which, if not compensated for, would tend to displace the two belts a distance to the left. However, by the compensating displacement of the shaft 1 to the right, as shown in Fig. 5 of the drawings, the two belts will be permitted to remain in their allotted fixed vertical planes. Then, when the handle 14 is returned to the position shown in full lines in Fig. 3 of the drawings, and in Figs. 1 and 2 of the drawings, the shaft 1 will be displaced endwise to the left, and again this compensating action will keep the belts 21 and 22 in their fixed vertical planes, whereby these adjustable pulleys, which in effect are adjustable to different diameters, will always remain in alignment with the ordinary V-pulleys at the other ends of the two belts. To insure the desired action, a spring 23 is preferably applied to the link 5, at its lower pivot, the tension of which tends to displace the shaft 1 endwise to the left, when the handle 14 is returned to the position shown in full lines in Fig. 3 of the drawings.

In Fig. 6 of the drawings, the construction is similar to that previously described, but in this case there are four adjustable pulleys, instead of two, with a view to doubling the friction belt surface, and thereby reducing the strain on each individual belt. For this purpose, the two pulley sections 24 and 25 are rigidly fastened to the shaft 26, the latter being supported like the shaft 1 previously described. The pulley sections 27 and 28 are rigid with each other and are splined on the shaft. In a similar manner, the two sections 29 and 30 are rigidly and integrally formed, and are splined on the shaft. The two sections 31 and 32 are rigidly and integrally formed, preferably, but are not splined on the shaft 26, but, to the contrary, are rigidly fastened to said shaft. The pulley sections 27 and 28 are rigidly connected with the pulley sections 29 and 30, through the medium of rods 33, to which these sections are secured by set screws 34, or any other suitable means. These rods slide endwise in the integrally formed sections 31 and 32, when the sections 27 and 28, and 29 and 30, are moved laterally to change the speed of transmission. In Fig. 6, the means for controlling the four pulleys, to spread two of them while contracting the other two, are the same as those previously described and need not be described again here. The belts of the pulleys of Fig. 6 are the same as those previously described, and may be arranged with two of them extending in one direction from the shaft, and the other two in the other direction, and in this way there is double the amount of belt friction surface that is found in Figs. 1 and 2 of the drawings. In this construction, the same expedients are employed for maintaining the belts in their fixed vertical planes, as those previously described.

Thus, in each form of the invention, there is a laterally movable shaft with at least one adjustable pulley thereon, having in effect a variable diameter, and in each form of the invention it is not necessary to move the motor to change the speed of transmission, as both the motor shaft and the shaft of the machine to be driven remain in fixed position, in a position to rotate about their fixed axes. Therefore, in each form of the invention, the only shaft that has lateral movement or displacement, to change the speed of transmission, is a counter shaft which is intermediate the motor and the shaft of the machine to be driven.

Thus it will be seen that the rock shaft 8 is held against endwise displacement, and that the hand lever 14, consequently, is arranged to operate in a fixed vertical plane. Thus, while the shaft 1 is movable endwise, as described, the shaft 8 is maintained in fixed position, as it rotates in fixed bearings 9 and 10, as shown and described.

Thus the links 4 and 5 have pivotal axes at their upper and lower ends, which are all parallel and disposed in position to permit some endwise movement of the shaft 1 when the latter moves laterally. In this way the shaft has a plurality of axes of rotation, all parallel, and at an angle to the said link axes.

What I claim as my invention is:

1. In a variable speed power transmission, of the V-belt and pulley type, the combination of a rock shaft supported in fixed bearings and held against endwise displacement in said bearings, arms pivoted on said rock shaft, so that each arm is movable at one end about an axis at its other end, which axis is disposed at right angles to said rock shaft, axially aligned bearings to which the other ends of said arms are pivoted, a pulley shaft supported in said axially aligned bearings, means for rocking said rock shaft to move said pulley shaft laterally, and means for causing said pulley shaft to move endwise a distance, while moving laterally.

2. A structure as specified in claim 1, said means for causing endwise displacement of the pulley shaft including a fixed cam for engaging one of said arms.

3. A structure as specified in claim 1, said means for moving the pulley shaft endwise including spring means engaging one of said arms to move the shaft endwise in one direction, and a fixed cam to move the shaft endwise in the other direction, against the yielding tension of said spring.

4. A structure as specified in claim 1, said means for rocking the rock shaft comprising a hand lever fixed thereon and movable back and forth in a fixed plane, together with means for holding said lever in any adjusted position thereof.

5. In a variable speed power transmission, a pulley shaft, laterally movable bearings for said shaft, whereby the latter is supported for rotation and lateral displacement, with means on the shaft to permit endwise displacement of the latter in said laterally movable bearings, having four sectional V-type pulleys thereon, with a V-belt for each pulley, constructed and operated for the contraction of an end pulley and the third one therefrom, while the other two pulleys are expanding, a section of said end pulley being rigidly connected to a section of said third pulley, by means extending slidingly through the second pulley.

6. In a variable speed power transmission, of the V-belt and pulley type, the combination of a pulley shaft mounted for lateral displacement, sectional V-pulleys on said shaft, so that a section of each pulley is adapted for axial displacement on said shaft, a V-belt for each pulley, a pulley for the other end of each belt, each mounted to rotate about a fixed axis, and controlling means for shifting said shaft laterally, thereby to spread the sections of one sectional pulley and contract the sections of the other sectional pulley, in effect increasing the diameter of one sectional pulley and decreasing the diameter of the other sectional pulley, by the pull of one belt, to vary the speed of power transmission, said controlling means comprising a rock shaft supporting the pulley shaft, means whereby the rock shaft is held against endwise displacement, and means operable in a fixed plane for rocking said rock shaft.

7. A structure as specified in claim 6, comprising means for displacing the said pulley shaft endwise to keep the two belts in their fixed planes.

8. A structure as specified in claim 6, the movable section of one pulley being operative to axially shift the movable section of another pulley.

9. A structure as specified in claim 6, comprising instrumentalities for maintaining the belts in their fixed planes.

10. In a variable speed power transmission, the combination of a support, link means pivoted at one end on said support, a member forming a shaft bearing, means whereby said link means is pivoted at the other end on said member, so that the link means has a plurality of parallel axes, a rotary shaft in said bearing, means to hold the shaft against endwise displacement in said bearing, relatively movable pulley sections on said shaft, and means for controlling movement of said link means to move said shaft sidewise, so that the latter has a plurality of parallel axes of rotation, said pivotal axis being disposed in position to permit some endwise displacement of said shaft during said lateral movement thereof.

11. A structure as specified in claim 10, said pivotal axes being disposed at right angles to said shaft axes.

12. A structure as specified in claim 10, said link means comprising separate links at opposite sides of said members.

13. A variable speed power transmission, comprising a shaft, pulleys on said shaft, belts leading to said pulleys, sleeve means forming bearings for said shaft, links having their upper ends pivoted on said means, a base having means providing pivotal support for the lower ends of said links, so that said shaft is movable laterally as well as endwise relatively to said base, to change the speed of transmission and keep said belts in fixed planes, said pivoted links providing a plurality of upper parallel axes extending at an angle to said shaft, and also a plurality of lower parallel axes extending parallel with said upper axes, there being provisions that effectuate the said change of speed when said shaft is moved laterally, and instrumentalities for causing said displacement of the shaft.

14. A structure as specified in claim 13, said pulleys each being of the laterally expansible V-type.

15. A structure as specified in claim 13, at least one of said pulleys being of the laterally expansible V-type.

16. A structure as specified in claim 13, said shaft having an arcuate path of travel when it moves laterally.

RICHARD S. JACOBSEN.